(12) United States Patent
Takai et al.

(10) Patent No.: US 8,047,940 B2
(45) Date of Patent: Nov. 1, 2011

(54) HEAT-RESISTANT RESIN BELT, MANUFACTURING METHOD THEREOF AND IMAGE FORMING APPARATUS

(75) Inventors: Atsushi Takai, Atsugi (JP); Sumio Kamoi, Tokyo (JP); Kazuo Ishida, Atsugi (JP); Toshikazu Hirakawa, Zama (JP); Atsushi Ishibe, Hiratsuka (JP); Hiroshi Katabami, Chigasaki (JP)

(73) Assignee: Ricoh Company, Ltd., Tokyo (JP)

( * ) Notice: Subject to any disclaimer, the term of this patent is extended or adjusted under 35 U.S.C. 154(b) by 98 days.

(21) Appl. No.: 12/206,945

(22) Filed: Sep. 9, 2008

(65) Prior Publication Data
US 2009/0069138 A1 Mar. 12, 2009

(30) Foreign Application Priority Data
Sep. 10, 2007 (JP) ................... 2007-234142

(51) Int. Cl.
*F16G 3/10* (2006.01)
(52) U.S. Cl. ........ 474/254; 474/237; 474/264; 399/307; 399/325; 399/328
(58) Field of Classification Search ............ 474/254, 474/253, 255–258
See application file for complete search history.

(56) References Cited

U.S. PATENT DOCUMENTS

| 2006/0133863 | A1* | 6/2006 | Asakura et al. | 399/307 |
| 2007/0105677 | A1* | 5/2007 | Takayama et al. | 474/237 |
| 2007/0109374 | A1* | 5/2007 | Strecker et al. | 347/95 |

FOREIGN PATENT DOCUMENTS

| DE | 3527599 | * | 2/1987 |
| DE | 3527599 | A1 | 2/1987 |
| JP | 59-12309 | | 1/1984 |
| JP | 60-727173 | | 4/1985 |
| JP | 7-295396 | | 11/1995 |
| JP | 10-698 | | 1/1998 |
| JP | 11-291348 | | 10/1999 |
| JP | 3411091 | | 3/2003 |
| JP | 2003270967 | A * | 9/2003 |
| JP | 2004053618 | * | 2/2004 |
| JP | 2005053618 | * | 2/2004 |
| JP | 2007-58059 | | 3/2007 |

OTHER PUBLICATIONS

Feb. 17, 2009 search report in connection with a counterpart European patent application No. 08 25 2969.

* cited by examiner

*Primary Examiner* — Robert Siconolfi
*Assistant Examiner* — San Aung
(74) *Attorney, Agent, or Firm* — Cooper & Dunham LLP (57) ABSTRACT

A heat-resistant endless resin belt including a heat-resistant resin sheet, which can be employed in a thermal fixing apparatus, wherein the sheet includes two cutting work parts in an inclined shape. The two parts are overlapped with each other and bonded with an adhesive to form a bonding part. An external shape displacement f(x), measured via a flatness measuring apparatus, which scans the belt in a width direction thereof, satisfies a following formula $$\int_0^x |f(x) - g(x)| dx \le \frac{XL}{6800},$$

wherein "X" (mm) is a length of the belt in a width direction thereof; "L" (mm) is a perimeter of the belt and "g(x)" represents a displacement of an ideal shape of the heat-resistant resin belt, when g(x)=C (a constant), a left side of the formula is set to be a minimum; whilst when g(x) is a variable, the displacement of the ideal shape of the belt is set.

9 Claims, 6 Drawing Sheets

| | WAVEFORM PATTERN | CALCULATED VALUE ACCORDING TO JAPANESE APPLICATION PUBLICATION NUMBER 2007-58059 | WRINKLING/STREAK | SHAVING OF INNER SURFACE |
|---|---|---|---|---|
| 1 |  | 0.131 | ABSENT | ABSENT |
| 2 |  | 0.161 | ABSENT | ABSENT |
| 3 |  | 0.241 | PRESENT | ABSENT |
| 4 |  | 0.242 | ABSENT | ABSENT |
| 5 |  | 0.315 | PRESENT | PRESENT |
| 6 |  | 0.405 | PRESENT | PRESENT |

CALCULATED VALUE OF FLATNESS AND EVALUATION RESULTS IN ACCORDANCE WITH PRIOR TECHNOLOGY

FIG. 3

| | WAVEFORM PATTERN | CALCULATED VALUE OF FLATNESS ACCORDING TO FORMULA (1) | WRINKLING/STREAK | SHAVING OF INNER SURFACE |
|---|---|---|---|---|
| 1 |  | 21.590 | ABSENT | ABSENT |
| 2 |  | 22.808 | ABSENT | ABSENT |
| 3 |  | 23.929 | ABSENT | ABSENT |
| 4 |  | 25.671 | PRESENT | ABSENT |
| 5 |  | 25.831 | PRESENT | PRESENT |
| 6 |  | 35.758 | PRESENT | PRESENT |

CALCULATED VALUE OF FLATNESS AND EVALUATION RESULTS IN ACCORDANCE WITH THE PRESENT INVENTION

HEAT-RESISTANT RESIN BELT, MANUFACTURING METHOD THEREOF AND IMAGE FORMING APPARATUS

CROSS-REFERENCE TO THE RELATED APPLICATION

This application is based on and claims the priority benefit of Japanese Patent Application No. 2007-234142, filed on Sep. 10, 2007, the disclosure of which is incorporated herein by reference in its entirety.

BACKGROUND

1. Technical Field

This disclosure relates to a heat-resistant endless resin belt, a manufacturing method thereof and an image forming apparatus using the heat-resistant endless resin belt. The heat-resistant endless resin belt, serving as a fixing belt or an intermediate transfer belt, may be employed in complex machines such as a copying machine, a facsimile, a printer, etc.

2. Description of the Related Art

In recent years, an image forming apparatus for color printing has been employed extensively and high-speed printing has been developed.

Compared with black-and-white printing, when color printing is performed, because adhered toner is larger in amount at one time, high pressure and high temperature are applied to a recording paper when the recording paper is passed through nip portions between rollers.

When the high-speed printing is developed, further high heat resistance and mechanical strength are required of an endless belt, which passes through nip portions.

The endless belt, for example can be made from polyimide resin.

As one method for manufacturing the endless belt, there is proposed a method of performing cast molding to provide polyimide varnish on an outer peripheral surface of a cylinder made of a metal, and thereafter obtaining a polyimide endless belt by heating and imidizing the resultant polyimide varnish whereto the cast molding is performed. (For reference, see Japanese Application Publication Number Hei7-295396)

However, the above-mentioned manufacturing method may cause the following two main problems. One of the problems is that the imidation process is time-consuming, which incurs a cost increase. The other is that a plurality of molds are required because a new mold is needed whenever the dimensional standard is altered, which increases an initial cost.

In view of the above problems, a manufacturing technique of an endless resin belt at a low cost is proposed (For reference, see Japanese Application Publication Number Hei11-291348). To be specific, the polyimide endless belt is manufactured by adhering a non-thermoplastic polyimide film and a thermoplastic polyimide resin sheet together, whereafter the thermoplastic polyimide resin sheet is melted and bonded.

However, for one thing, it is difficult to make a film thickness of an overlapped portion of a resin film and sheet to be virtually the same as a non-overlapped portion of the film and sheet. For another, bonding without altering a hardness and a surface property of the two sheets cannot be easily executed in practice. Consequently, when a fixed image is formed by the finally manufactured resin belt, there is a problem that a streaky defective image is generated.

It is also proposed that an endless resin belt can be manufactured via forming a groove-like protrusion and recess in a thickness direction at both ends of a polyimide resin sheet, whereafter fitting the protrusion in the recess and bonding (For reference, see Japanese Application Publication Number Hei10-698).

The problem with the aforementioned resin belt which is processed at both ends and is joined by an adhesive (a joined belt will be used hereinafter) lies in the circumferential length accuracy of the belt, which remains to be solved hereafter.

Although the circumferential length accuracy may differ according to specification standards of the image forming apparatus whereto the resin belt is applied and a diameter of the resin belt, the circumferential length accuracy of the resin belt is preferably approximately equal to or less than 0.05 mm.

In particular, when the circumferential length accuracy differs in a width direction of the belt (the axial direction wherein the endless resin belt is stretched), the belt skews, which is transcribed by the recording paper upon printing. Consequently, wrinkling is present on the recording paper.

In addition, when the image forming apparatus is in operation and the belt is in contact with a heat roller and a pressure roller, a perimeter distribution poses a problem of belt skew, which probably causes local shaving of the belt inner surface.

Thus, in order to maintain image quality, it is important to enhance the circumferential length accuracy, namely flatness, in the axial direction of the heat-resistant resin belt which constitutes the image forming apparatus.

There is proposed a flatness measuring method to measure the flatness of the heat-resistant endless belt (For reference, see Japanese Application Publication Number 2007-58059). To be specific, the seamless belt is stretched by a predetermined tensile force via at least two rollers and is set in a non-rotating state. The flatness is measured via surface scanning. In accordance with this method, in order to solve the problem arising at the time of image forming, the flatness is limited to be equal to or less than 5 mm throughout the seamless belt.

However, in the case of the endless resin belt joined at the both ends, various flatness patterns arise, which is rather different from the case with the seamless belt. Therefore, even if the flatness is limited to be equal to or less than 5 mm, the problem that the wrinkling is unalterably transcribed to the recording paper remains unsolved.

BRIEF SUMMARY

In an aspect of this disclosure, there is provided an approach to enhance both the durability of a heat-resistant endless resin belt which is manufactured by joining both ends thereof and built into an image forming apparatus, and an image quality. The durability of such a belt can be enhanced via preventing shaving of the inner surface thereof. When printing is performed using the heat-resistant endless resin belt, via investigating a calculating method of a belt flatness and an evaluation of such a method, defective image transcribing can be prevented, whereby the image quality can be enhanced.

In another aspect of this disclosure, there is provided a heat-resistant endless resin belt which can be employed in a thermal fixing apparatus used to fix a toner image to a recording medium. The heat-resistant resin sheet includes a first cutting work part formed by cutting a front surface of one end of the heat-resistant resin sheet into an inclined shape in section; and a second cutting work part formed by cutting a rear surface of the other end into an inclined shape in section, both of the first cutting work part and the second cutting work part being overlapped with each other and bonded with an adhesive to form a bonding part. An external shape displacement f(x), measured via a flatness measuring apparatus, for example, a displacement gauge, which scans the heat-resistant resin belt in a width direction of the heat-resistant resin belt, satisfies a following formula $$\int_0^x |f(x) - g(x)| dx \leq \frac{XL}{6800},$$

wherein "X" (mm) is a length of the belt in a width direction thereof; "L" (mm) is a perimeter of the belt and "g(x)" represents a displacement of an ideal shape of the heat-resistant resin belt; here, when g(x)=C (a constant), a left side of the formula is set to be a minimum; whilst when g(x) is a variable, the displacement of the ideal shape of the heat-resistant resin belt is set.

DETAILED DESCRIPTION OF THE PREFERRED EMBODIMENTS

Embodiment 1

Preferred embodiments of the present invention will be explained in detail hereinafter with reference to the accompanying drawings.

As one embodiment, a heat-resistant resin belt according to the present invention is applied to a heat-resistant endless resin belt employed in a thermal fixing apparatus used to fix a toner image to a recording medium.

The heat-resistant resin belt is formed by using a heat-resistant resin sheet having a desired characteristic. More specifically, the heat-resistant resin sheet includes a first cutting work part formed by cutting the front surface of one end of the heat-resistant resin sheet into an inclined shape in section, and a second cutting work part formed by cutting the rear surface of the other end into an inclined shape in section.

These cutting work parts are overlapped with each other at the inclined shapes and bonded with an adhesive to form a bonding part.

Figure 1:
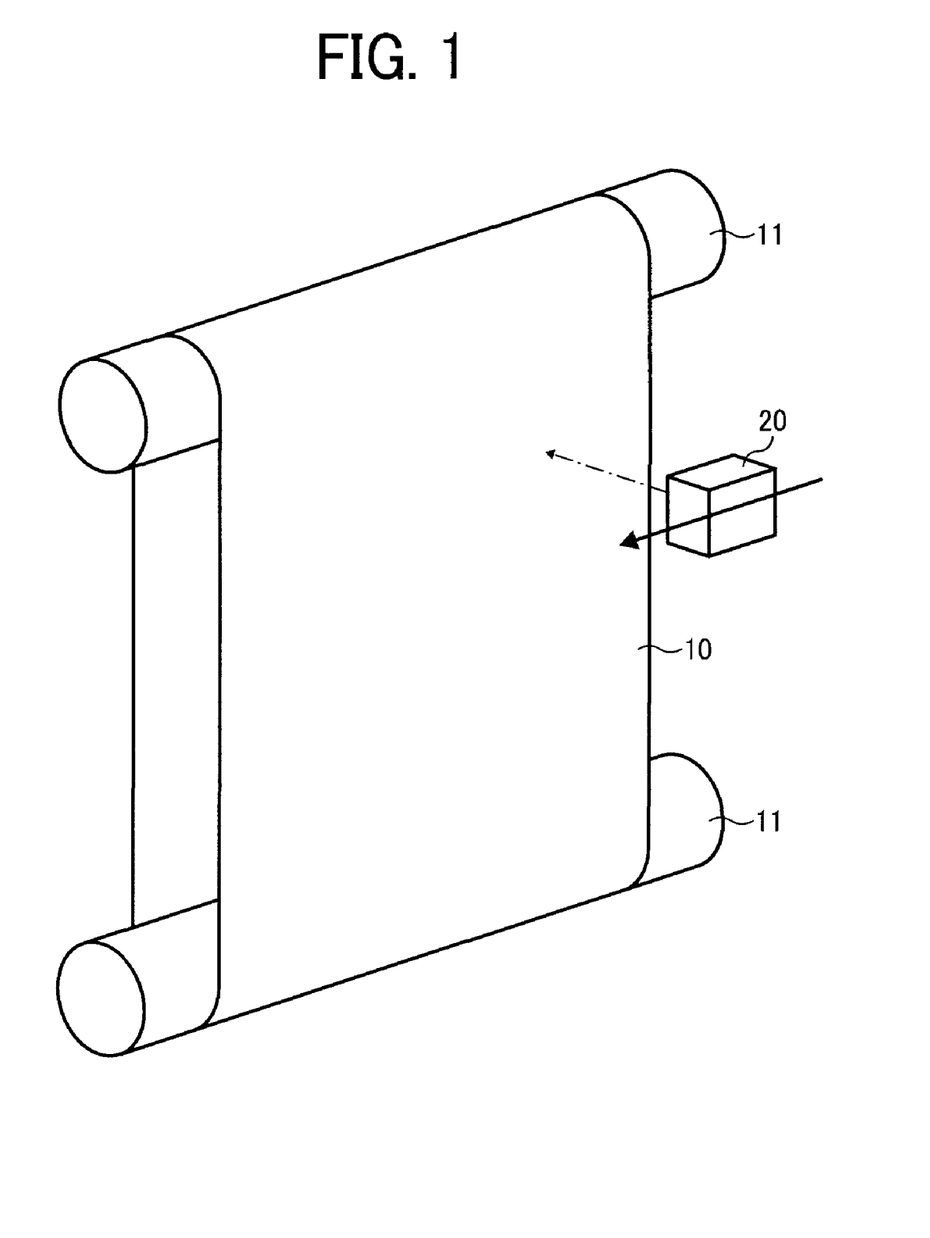
FIG. 1 is a schematic perspective view showing a state wherein a flatness of a heat-resistant resin belt is measured.

In particular, the heat-resistant resin belt 10 according to an embodiment of the present invention has a structure in which an external shape displacement f(x) is measured via a flatness measuring apparatus, such as a displacement gauge 20, which scans the heat-resistant resin belt 10, for example, in a direction of shafts 11 used to stretch the heat-resistant resin belt 10, as shown in FIG. 1. The external shape displacement f(x) satisfies a following formula.

$$\int_0^x |f(x) - g(x)| dx \leq \frac{XL}{6800} \quad (1)$$

wherein "X" (mm) is a length of the belt in a width direction thereof; "L" (mm) is a perimeter of the belt and "g(x)" represents a displacement of an ideal shape of the heat-resistant resin belt. When g(x)=C (a constant), a left side of the formula is set to be a minimum; whilst when g(x) is a variable, the displacement of the ideal shape of the heat-resistant resin belt is set.

Measurement of a flatness of the heat-resistant resin belt will be illustrated as follows.

The heat-resistant resin belt is stretched by a predetermined tensile force via at least two rollers and is set in a non-rotating state.

The flatness of the heat-resistant resin belt is measured by the flatness measuring apparatus, such as the displacement gauge 20 according to an embodiment of the present invention, via surface scanning in a width direction of the belt (an axial direction wherein the endless belt is stretched).

Figure 2:
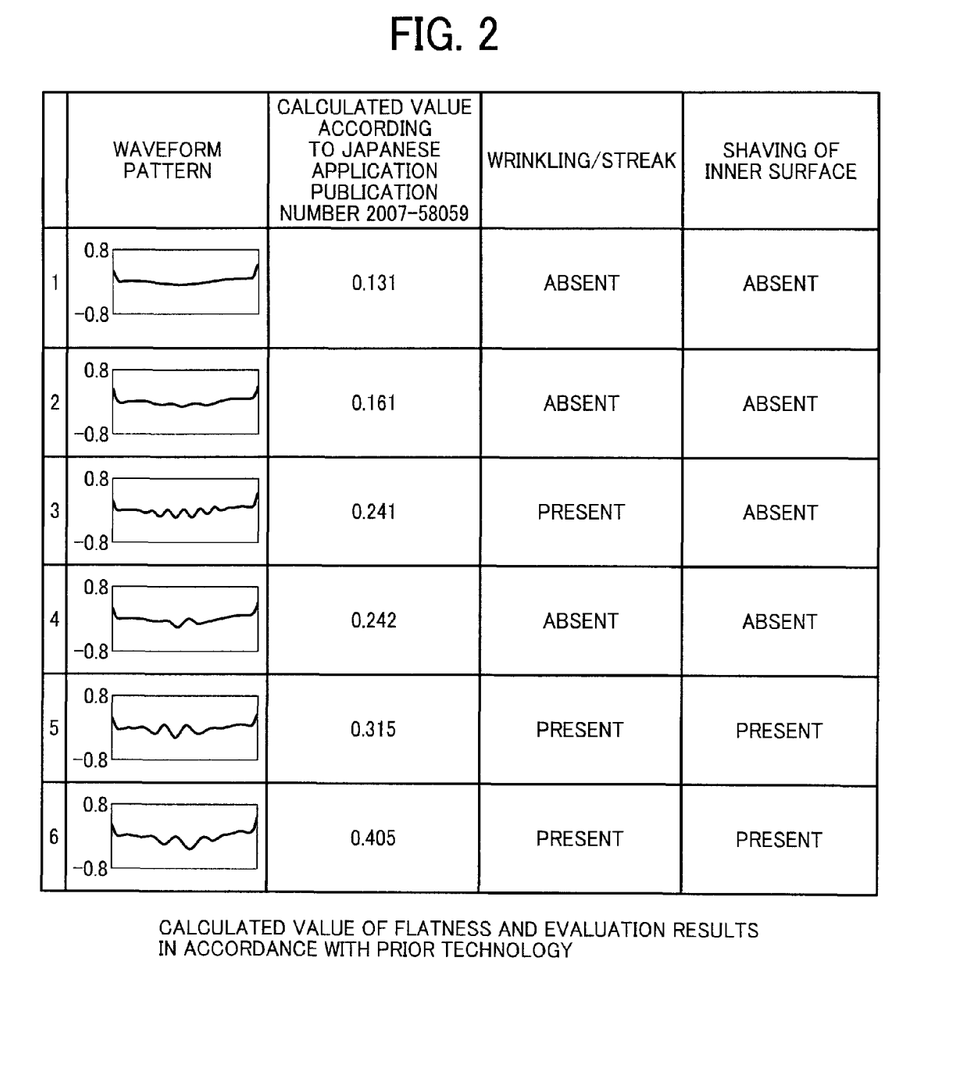
FIG. 2 is a table showing calculated values of flatness and evaluation results thereof in accordance with a prior technology.

In FIG. 2, waveform patterns of the flatness, calculated values and evaluation results obtained via a printing test performed on a real printer are given in accordance with the prior technology (as disclosed in Japanese Application Publication Number 2007-58059). The evaluation is performed with respect to the flatness of the heat-resistant resin belt via focusing on a maximum value and a minimum value of obtained data.

In FIG. 2, although compared with a pattern 4, a pattern 3 is more highly evaluated with respect to the flatness, the wrinkling or a wormlike defective image occurs when a printing test is performed on a real printer.

Therefore, in Japanese Application Publication Number 2007-58059, a correct relationship is not sufficiently revealed between the calculated value of the flatness and the occurrence of the wrinkling or the wormlike defective image, as well as the presence or absence of shaving of the belt inner surface coating film, when the printing evaluation is performed on the real printer.

Since in accordance with Japanese Application Publication Number 2007-58059, the calculated values of the belt flatness are obtained merely by subtracting the minimum value from the maximum value within an effective region of the belt flatness, there arises a problem of not sufficiently coping with a case wherein vibration frequency is high, such as the pattern 3.

In contrast, in accordance with an embodiment of the present invention, a defect of the conventional technology is improved via confining the belt flatness according to the formula (1) above.

Figure 3:
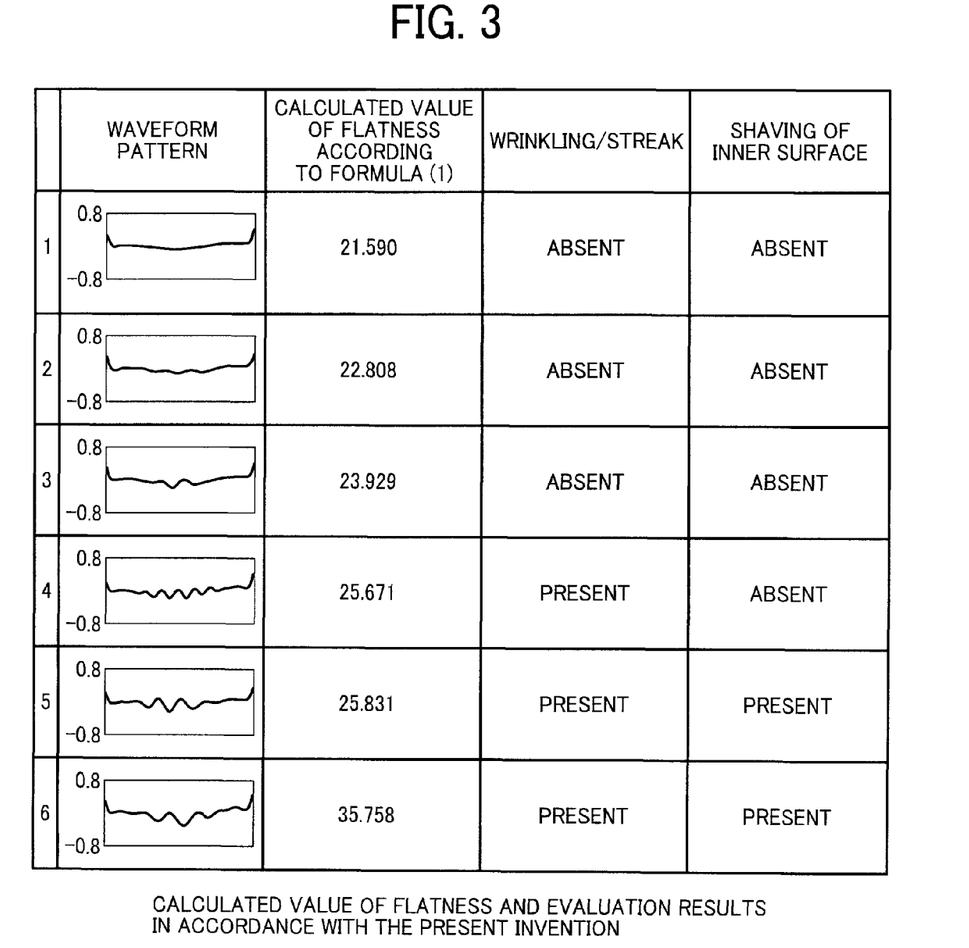
FIG. 3 is a table showing calculated values of flatness and evaluation results in accordance with an embodiment of the present invention.

FIG. 3 shows calculated values of the belt flatness in accordance with the formula (1) and evaluation results when the printing evaluation is performed on the real printer. Here, the evaluation results include the evaluation results of the wrinkling or wormlike defective image which is undesirably transcribed to the recording paper and the evaluation results of the presence or the absence of the shaving of the belt inner surface coating film.

As illustrated in FIG. 3, the following evaluation results are obtained.

More specifically, with respect to the patterns 1 to 3, neither the undesirable wrinkling or the wormlike defective image is transcribed to the recording paper nor is there the presence of shaving of the belt inner surface coating film, and therefore a satisfactory evaluation result is obtained in practice; with respect to pattern 4, the undesired transcript of the wrinkling or the wormlike defective image to the recording paper is confirmed; and with respect to patterns 5 and 6, both the undesired transcript of the wrinkling or the wormlike defective image to the recording paper and the presence of the shaving of the belt inner surface coating film are confirmed.

Therefore, considering the above, both the durability of the inner surface coating film of the belt and printing quality can be contrived to be improved via executing the appropriate evaluation illustrated as above in accordance with the calculated values obtained from the formula (1).

Figure 4:
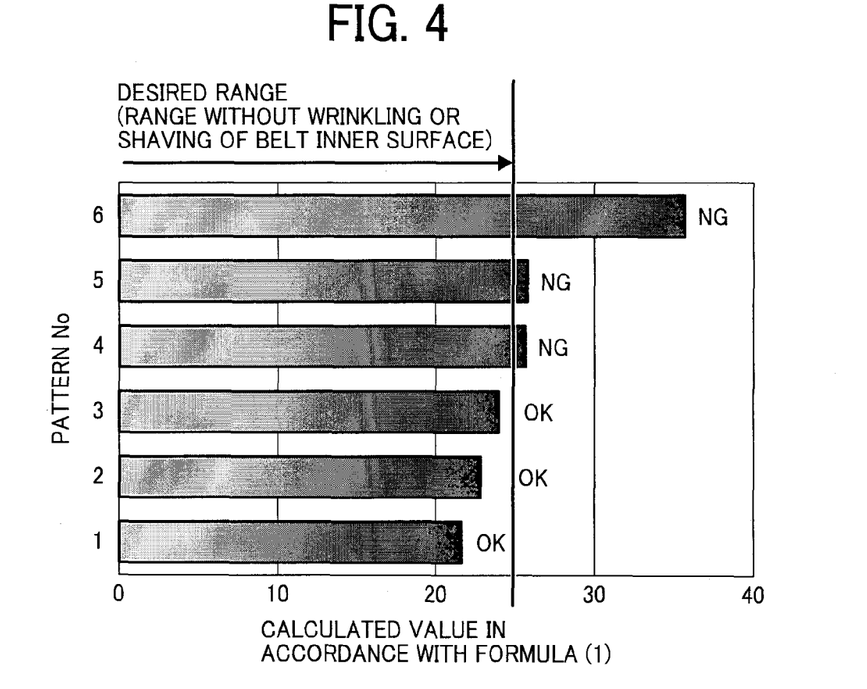
FIG. 4 is a graph giving a relationship between the calculated values of the heat-resistant resin belt obtained in accordance with a formula (1) and evaluation results obtained when a printing evaluation is performed on a real printer.

In FIG. 4, corresponding to the respective six sample patterns of the heat-resistant resin belt in FIG. 3, a relationship is indicated between the calculated values obtained from the formula (1) and the evaluation results when the printing evaluation is performed on the real printer. Here, in the formula (1), "X" and "L" are set to be 395 and 439.823 respectively, wherefrom a formula (2) is obtained after the calculation is performed as follows.

$$\int_0^x |f(x) - g(x)| dx \leq \frac{XL}{6800} = 25.548 \quad (2)$$

It is confirmed that when the calculated value is equal to or smaller than 25.548, both the printing quality and the durability of the inner surface coating film of the belt can be evaluated to be satisfactory.

Embodiment 2

In regard to a constituent substance of the heat-resistant resin belt, according to an embodiment of the present invention, a thermosetting polyimide is preferred.

To be specific, although examples of the constituent substance of the heat-resistant resin belt may include polyimide, polyether ether ketone, polyphenylene sulfide, polyethersulfone, polysulfone, etc., in terms of heat resistance and mechanical strength, the thermosetting polyimide is preferred as the constituent substance of the heat-resistant endless resin belt according to an embodiment of the present invention.

Embodiment 3

In accordance with an embodiment of the present invention, the adhesive aforementioned will be illustrated hereinafter. A heat-resistant addition polymerization type silicone adhesive is preferred as the adhesive used to bond both ends of the heat-resistant resin sheet.

In regard to a constituent substance of the adhesive, silicon or the like wherein pigments of ferrioxide (e.g. colcothar, etc.), titanium oxide, metal oxide or the like are dispersed, which is insusceptible to oxygen radical, is particularly preferred.

A silicone adhesive, a urethane adhesive, a polyimide (PI) adhesive, and an epoxy adhesive or the like have been conventionally used as the adhesive to bond the heat-resistant resin sheet, which is dominated by a polyimide film. However, a silicone adhesive is most preferable because of possessing all of the following four properties:

(1) being capable of firmly bonding the polyimide film and possessing shearing strength adequate to a fracture level of the polyimide film;

(2) when heat treatment is performed at a temperature of 300° C.~350° C. for 30 minutes, adhesivity thereof is hardly deteriorated;

(3) the adhesivity does not deteriorate in an operation environment of 150° C.~200° C.;

(4) the bonded joint parts do not affect the function of components of the resin sheet.

The silicone adhesive can be broadly classified into two kinds, namely a condensation-reactive type silicone adhesive and an addition polymerization type silicone adhesive.

There are three kinds of the condensation-reactive type silicone adhesive, which are a deoximation type silicone-based adhesive, a de-acetic acid type silicone-based adhesive and a deacetone type silicone-based adhesive. Since all of these three kinds of adhesive react undesirably with moisture in the air, a resultant hardener thereof is low in strength. Consequently, when the polyimide film is bonded with such an adhesive, the shearing strength is not adequate for the fracture level of the polyimide film. Furthermore, because the reaction of such an adhesive proceeds even at room temperature, the pot life tends to be short, which is a constraint on an application method thereof. In addition, these condensation-reactive type silicone additives tend not to be applicable to an application method, such as a high-productivity screen printing method.

In contrast, since the addition polymerization type silicone adhesive is addition-polymerized via heating, a cross-linking reaction proceeds at 100° C.~150° C. Because a resultant hardener is higher in strength than that of the condensation-reactive type silicone one, when the polyimide film is bonded with such an adhesive, the shearing strength is adequate for the fracture level of the polyimide film. Furthermore, since a reactivity of the addition polymerization type silicone adhesive is low at room temperature, the pot life thereof can be guaranteed around the clock (24 hours) at room temperature, which generates an advantage since processing can be continuously performed by the screen printing method. Therefore, the addition polymerization type silicone adhesive is preferred according to an embodiment of the present invention.

Embodiment 4

Finally, in order to obtain a fixing belt constituting an image forming apparatus, an elastic layer made from a silicone compound and a release layer made from a fluororesin compound are laminated in turn on the heat-resistant resin belt with the aforementioned composition.

The heat-resistant resin belt can also be used as an intermediate transfer belt constituting the image forming apparatus.

Thus, the adhesiveness at both ends, surface smoothness and wettability are all satisfactorily achieved in the aforementioned heat-resistant resin belt, which can contribute to formation of a high-quality image.

Embodiment 5

In accordance with an embodiment of the present invention, the heat-resistant resin belt can be made as follows. First, cutting is performed at both ends of the heat-resistant resin sheet which is cut into a predetermined size. Then the adhesive is applied to the cut sections of both ends. After overlapping the cut sections of both ends, the heat-resistant resin belt can be made via heating and pressurizing the adhesive.

Figure 5:
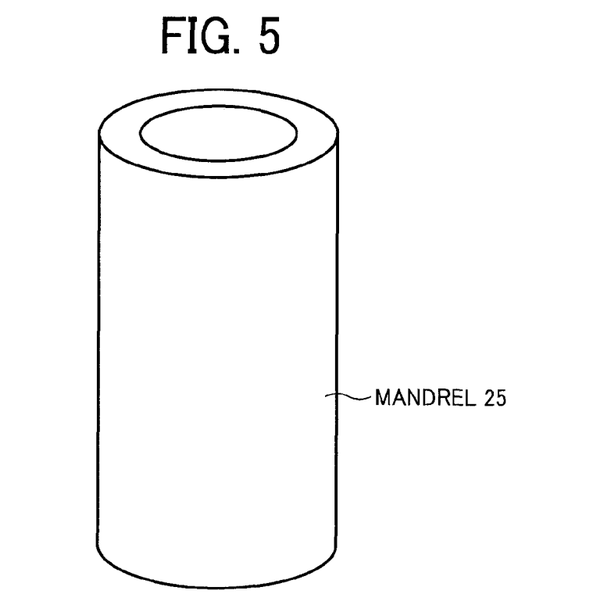
FIG. 5 is a schematic perspective view showing a mandrel employed for heat treatment.

In addition, after the heating, the pressurizing and a primary hardening are performed, the flatness of the heat-resistant resin belt can be enhanced, after a mandrel 25, as illustrated in FIG. 5, is inserted into an inside of the belt, via performing the heat treatment.

To be specific, here, a thermal expansion coefficient of the mandrel 25 is larger than that of the resin sheet used to form the heat-resistant resin belt according to an embodiment of the present invention, whereby an expansion diameter of the mandrel is larger than that of the belt. Thus, a peripheral surface of the mandrel is pressed against the inner surface of the resin belt due to thermal expansion of the mandrel. Therefore, the flatness accuracy of the resin belt can be enhanced.

The mandrel 25 used here has an accuracy of equal to or less than 0.01 mm throughout in both an axial direction and a circumferential direction. The heat treatment temperature is preferably set to be 150° C.~280° C., which is higher than that required when the primary hardening of the adhesive is performed.

As illustrated in the following two examples, two samples of the heat-resistant endless resin belt in accordance with an embodiment of the present invention were made and an evaluation of the characteristics thereof was performed.

EXAMPLE 1

(a) A thermosetting polyimide sheet with a thickness of 75 μm was cut into a size of 447 mm×400 mm.

(b) The thermosetting polyimide sheet includes a first cutting work part and a second cutting work part, both of which are cut into inclined shapes with a thickness of 19 μm at their respective ends and a width of 7.5 mm. The first cutting work part was formed by cutting the front surface of one end of the sheet lengthwise, departing from the one end by 7.5 mm. The second cutting work part was formed by cutting the rear surface of the other end of the sheet lengthwise, departing from the other end by 7.5 mm.

(c) 0.8 wt. % of a $SiO_2$ fine particle with an average particle diameter of 8.0 μm and a CV value of 4.5% was mixed with the addition polymerization type silicone adhesive, compounded with colcothar, whereby the adhesive was prepared.

(d) The prepared adhesive was applied by the screen printing method on one surface of the thermosetting polyimide sheet in such a manner that a coating width attained 7.0 mm and a coating thickness attained 10±1.5 μm.

Figure 6:
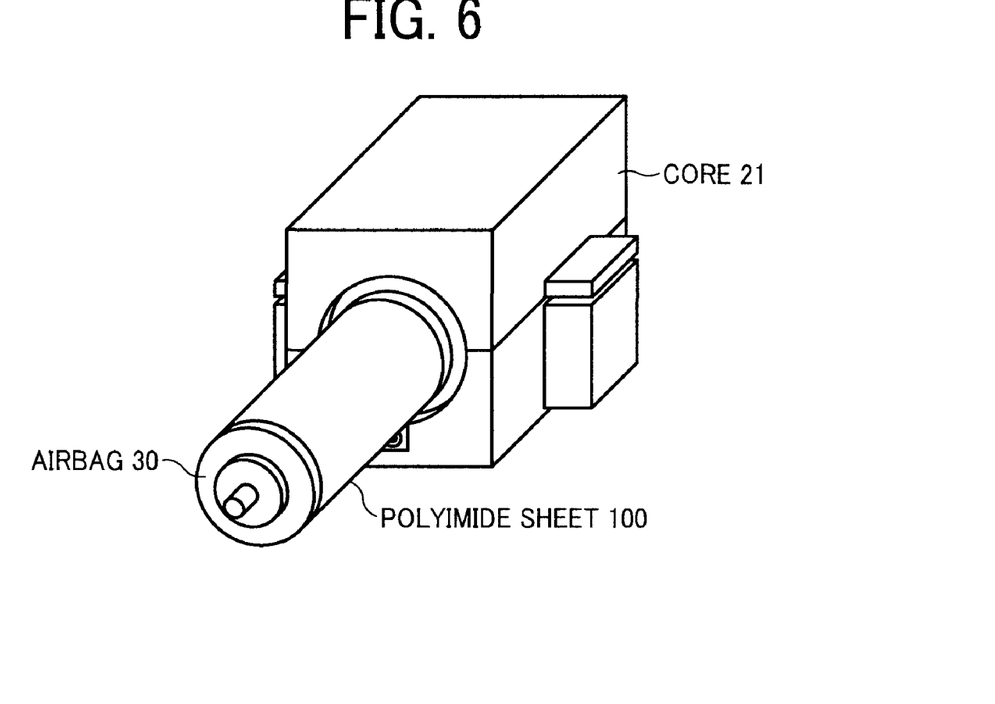
FIG. 6 is a perspective view showing a process of manufacturing the heat-resistant resin belt according to an embodiment of the present invention, with a polyamide sheet being inserted in a core.
Figure 7:
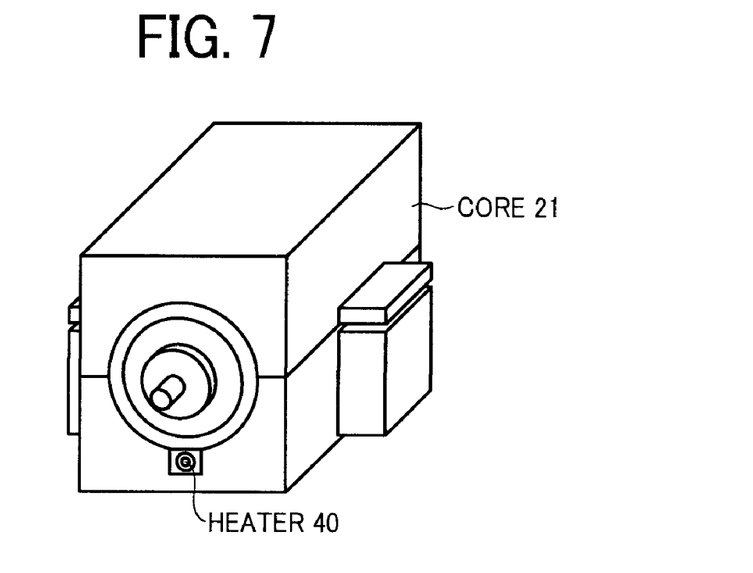
FIG. 7 is a perspective view showing a process of manufacturing the heat-resistant resin belt according to an embodiment of the present invention, with the polyamide sheet completely inserted in the core.

(e) The thermosetting polyimide sheet whereon the adhesive is applied was rolled into a cylindrical shape and was inserted into a hollowed-out core. The two ends of the cylindrical polyimide sheet were overlapped to join each other. Then, as illustrated in FIG. 6, an airbag 30 was inserted into the inside of the polyimide belt and air was introduced into the airbag 30. Then an air pressure of the airbag 30 was increased to 0.5 MPa, whereby the polyimide sheet 100 was pressed against an inner wall of the core 21, in order to make the outer diameter of the cylindrical polyimide sheet the same as an inner diameter of the core. As illustrated in FIG. 7, the overlapped end parts were heated to 170° C. via a heater 40 and left for 5 minutes, whereby performing the primary hardening to the adhesive.

(g) A 30-minute heat treatment was performed on the overlapped polyimide sheet 100 at a temperature of 200° C. using an aluminium mandrel with an outer diameter of 139.415±0.008 mm, whereby a complete hardening was performed on the adhesive. Thus, a resultant heat-resistant endless resin belt was obtained.

(h) A flame treatment using a silicone resin was performed on the entire front and rear surfaces of the heat-resistant endless resin belt and subsequently a coating of $SiO_2$ was applied.

(j) A silicone resin solution was spray-coated to form a coating film, whereafter the coating film was baked for 2 hours at a temperature of 150° C. to form a film with a thickness of 205 μm. Thus, the silicone elastic layer was formed.

(i) A coating film was formed via spray-coating a water dispersions of PFA (tetrafluoroethylene-perfluoro(alkylvinyl ether)copolymer) on a surface of the silicone elastic layer. Then the heat treatment was performed for 20 minutes at a temperature of 340° C., whereby the release layer with a thickness of 25 μm was formed. Thus, the intended fixing belt made from the heat-resistant resin was obtained.

When the external shape displacement f(x) of the heat-resistant resin belt of φ 140 mm, made by the aforementioned forming process, was measured, a satisfactory value of 22.908 was obtained, which is smaller than the calculated value 25.548 in accordance with the formula (2).

Figure 8:
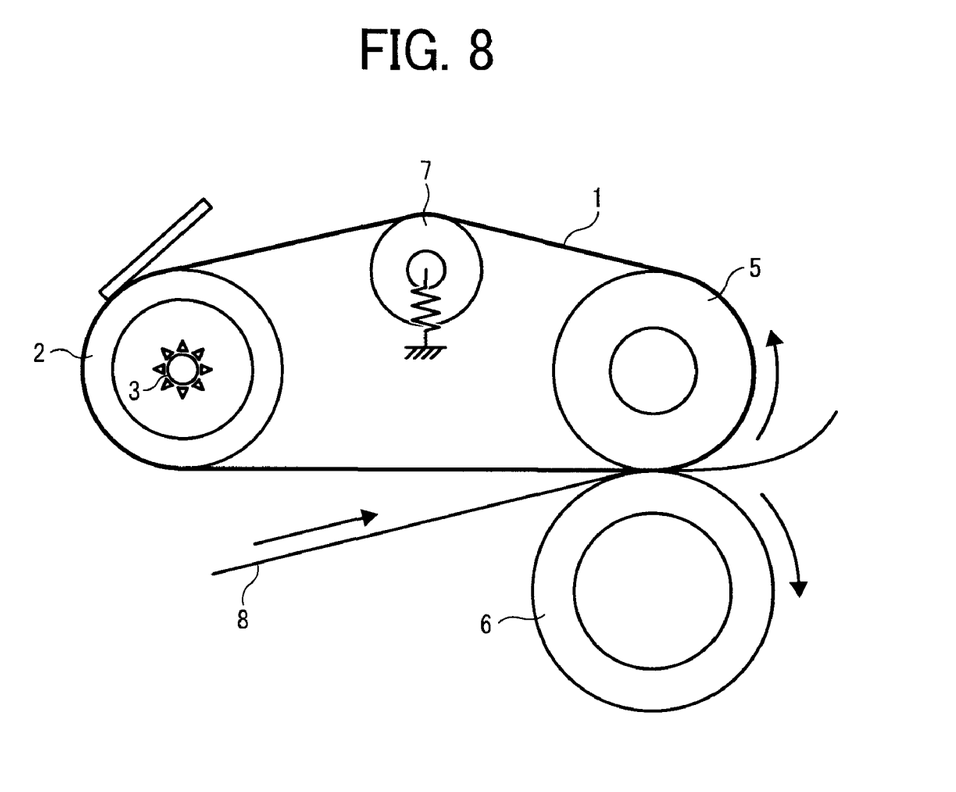
FIG. 8 is a view showing a schematic configuration of a fixing unit.

An idle running test which is equivalent to 400×1000 copies was performed after the heat-resistant resin belt, serving as the fixing belt, was built into a fixing unit, whose composition is illustrated in FIG. 8.

This fixing unit is composed of a fixing roller 5, a fixing belt 1, a heat roller 2, a pressure roller 6 and a tension roller 7. The heat roller 2 and the pressure roller 6 are provided with a halogen heater as a heat source inside.

When the inner surface of the heat-resistant resin belt was examined, a satisfactory result was obtained in practice because only traces of shaving caused merely by wear were detected on the inner surface without any adhesion of an abrasive powder.

After the idle running test was performed, in order to evaluate a fixed image, the fixing belt was installed in the real printer and, a recording paper 8 was fed into the printer. A good-quality image was formed because neither wrinkling was present, nor was a streaky defective image on the joint parts of the belt visually recognizable.

EXAMPLE 2

(a) The thermosetting polyimide sheet with a thickness of 75 μm was cut into a size of 447 mm×400 mm.

(b) The thermosetting polyimide sheet includes a first cutting work part and a second cutting work part, both of which are cut into an inclined shape, with a thickness of 19 μm at their respective ends and a width of 7.5 mm. The first cutting work part was formed by cutting the front surface of one end of the heat-resistant resin sheet lengthwise, departing from the one end by 7.5 mm. The second cutting work part was formed by cutting the rear surface of the other end of the heat-resistant resin sheet lengthwise, departing from the other end by 7.5 mm.

(c) 0.8 wt. % of a $SiO_2$ fine particle with an average particle diameter of 8.0 μm and a CV value of 4.5% was mixed with the addition polymerization type silicone adhesive, compounded with colcothar, whereby the adhesive was obtained.

(d) The prepared adhesive was applied by the screen printing method on one surface of the thermosetting polyimide sheet in such a manner that a coating width attained 7.0 mm and a coating thickness attained 10±1.5 μm.

(e) The thermosetting polyimide sheet whereon the adhesive is applied was rolled into a cylindrical shape and was inserted into a hollowed-out core. The two ends of the cylindrical polyimide sheet were overlapped to join each other. Then, as illustrated in FIG. 6, an airbag 30 was inserted into the inside of the polyimide sheet 100 and the air was introduced into the airbag 30. Then the air pressure of the airbag 30 was increased to 0.5 MPa, whereby the polyimide sheet 100 was pressed against an inner wall of the core 21, in order to make the outer diameter of the cylindrical polyimide sheet the same as the inner diameter of the core. As illustrated in FIG. 7, the overlapped end parts were heated to 190° C. via a heater 40 provided at the joint parts of the two ends, and were left for 3 minutes, whereby performing the primary hardening to the adhesive.

(g) A 30-minute heat treatment was performed on the overlapped polyimide sheet at a temperature of 200° C. using an aluminium mandrel made of SUS with an outer diameter of 139.522±0.005 mm, whereby a complete hardening was performed on the adhesive. Thus, a resultant heat-resistant endless resin belt was obtained.

(h) A flame treatment using a silicone resin was performed on the entire front and rear surfaces of the heat-resistant endless resin belt and subsequently a coating of $SiO_2$ was applied.

(j) A silicone resin solution was spray-coated to form a coating film, whereafter the coating film was baked for 2 hours at a temperature of 150° C. to form a film with a thickness of 205 μm. Thus, the silicone elastic layer was formed.

(i) A coating film was formed via spray-coating a water dispersions of PFA (tetrafluoroethylene-perfluoro(alkylvinyl ether)copolymer) on a surface of the silicone elastic layer. Then the heat treatment was performed for 20 minutes at a temperature of 340° C., whereby the release layer with a thickness of 25 μm was formed. Thus, the intended fixing belt was obtained.

When the external shape displacement f(x) of the heat-resistant resin belt, serving as the fixing belt, of φ 140 mm, made by the aforementioned forming process, was measured, a satisfactory value of 21.202 was obtained, which is smaller than the calculated value 25.548 in accordance with the formula (2).

An idle running test which is equivalent to 400×1000 copies was performed after the fixing belt was built into a fixing unit, whose composition is illustrated in FIG. 8.

When the inner surface of the fixing belt was examined, a satisfactory result was obtained in practice because only traces of shaving caused merely by wear were detected on the inner surface without any adhesion of an abrasive powder.

After the idle running test was performed, in order to evaluate a fixed image, the fixing belt was installed in the real printer and, a recording paper was fed into the printer. A good-quality image was formed because neither wrinkling was present, nor was a streaky defective image on the joint parts of the belt visually recognizable.

According to one embodiment of the present invention, effects can be obtained as follows.

An improvement in the durability of the heat-resistant endless resin belt made by joining both ends thereof and a high-quality image are obtained via setting the value of the belt external shape displacement f(x). More specifically, when the image is formed, for one thing, defective image transcribing can be prevented; for another thing, shaving of the belt inner surface can be suppressed.

A resin belt with excellent heat resistance and high mechanical strength is obtained using the thermosetting polyimide as the constituent substance of the heat-resistant resin belt. Furthermore, the value of the belt external shape displacement f(x) can be reduced. In addition, an improvement in the durability of the resin belt and a high-quality image are achieved. More specifically, when the image is formed, for one thing, wrinkling transcribed to the recording paper can be prevented; for another thing, shaving of the belt inner surface can be suppressed.

Since an addition polymerization type silicone adhesive is used, the polyimide-based material can be firmly bonded by the addition polymerization type silicone adhesive while maintaining the flexibility of the resin sheet. In addition, when heat treatment for post-processing is performed at a temperature of 300° C.~350° C. for 30 minutes, a thermal oxidation deterioration caused by the heat treatment can be suppressed. Therefore, a heat-resistant resin belt with high reliability is obtained.

Since the elastic layer made of the conductive silicone compound and the release layer made from the fluororesin compound are laminated in turn on an outer peripheral surface of the heat-resistant resin belt, a fixing belt with an excellent performance in practice, constituting an image forming apparatus, is obtained at a low cost.

Since the heat-resistant resin belt, whose value of the external shape displacement f(x) in the width direction of the belt is set, is used as an intermediate transfer belt, an image forming apparatus with a lasting high transcribing capability capable of forming a high-quality image is obtained.

Since the heat-resistant resin belt, whose value of the external shape displacement f(x) in the width direction of the belt is set, is used as the fixing belt, an image forming apparatus with a lasting high transcribing capability capable of forming a high-quality image is obtained.

The flatness of the heat-resistant resin belt can be enhanced via heating and pressurizing the adhesive, whereafter the primary hardening is performed thereon; and via inserting a mandrel into an inner peripheral part of the heat-resistant resin belt, the heat treatment is performed. In addition, via setting the value of the belt external shape displacement f(x), wrinkling transcribed to the recording paper can be avoided upon printing when the resin belt is used in the image forming apparatus, and shaving of the belt inner surface can be further prevented.

Although the present invention has been described in terms of exemplary embodiments, it is not limited thereto. It should be appreciated that various changes and modifications can be made to the embodiments by persons skilled in the art without departing from the scope of the present invention as defined by the following claims.

What is claimed is:

1. A heat-resistant resin belt, which can be employed in a thermal fixing apparatus used to fix a toner image to a recording medium, the heat-resistant resin belt comprising:
   a heat-resistant resin sheet;
   a first cutting work part formed by cutting a front surface of one end of the heat-resistant resin sheet into an inclined shape in section; and
   a second cutting work part formed by cutting a rear surface of the other end into an inclined shape in section, wherein both of the inclined work parts are overlapped with each other and bonded with an adhesive to form a bonding part; and wherein an external shape displacement f(x) of the heat-resistant resin belt, measured via a flatness measuring apparatus, which scans the heat-resistant resin belt, satisfies a following formula $$\int_0^x |f(x) - g(x)| dx \leq \frac{XL}{6800},$$

wherein "X" (mm) is a length of the heat-resistant resin belt in a width direction thereof; "L" (mm) is a perimeter of the heat-resistant resin belt; "x" is a length from a scan beginning point in a scanning direction parallel to each of the longitudinal axes of shafts used to stretch the heat-resistant belt or an edge of the heat-resistant belt; and "g(x)" represents an ideal external shape displacement of the heat-resistant resin belt, here, when g(x)=C (a constant profile), a special profile is set to g(x) so that a left side of the formula (1) takes a minimum value; whilst, when g(x)=a variable, another special profile or an ideal external shape displacement of the heat-resistant resin belt to be targeted by which neither wrinkling occurred in a test paper when the thus manufactured heat-resistant belt is built into an image forming apparatus and printing is performed using the heat-resistant belt or shaving of an inner surface of the heat-resistant belt is present, is set to g(x).

2. The heat-resistant resin belt according to claim 1, wherein the heat-resistant resin sheet is made from a thermosetting polyimide resin.

3. The heat-resistant resin belt according to claim 1, wherein the adhesive is an addition polymerization type silicone adhesive.

4. The heat-resistant resin belt according to claim 2, wherein the adhesive is an addition polymerization type silicone adhesive.

5. The heat-resistant resin belt according to claim 1, wherein an elastic layer made of a silicone compound and a release layer made from a fluororesin compound are formed on an outer peripheral surface of the heat-resistant resin belt.

6. An image forming apparatus comprising an intermediate transfer belt, wherein the intermediate transfer belt is the heat-resistant resin belt according to claim 1.

7. An image forming apparatus comprising a fixing belt, wherein the fixing belt is the heat-resistant resin belt according to claim 1.

8. A manufacturing method of the heat-resistant resin belt as claimed in claim 1, the heat-resistant resin belt being configured to be employed in a thermal fixing apparatus used to fix a toner image to a recording medium, the manufacturing method comprising the steps of:

cutting a front surface of one end of the heat-resistant resin sheet into an inclined shape in section to form a first cutting work part;

cutting a rear surface of the other end into an inclined shape in section to form a second cutting work part;

bonding with an adhesive the first cutting work part and the second cutting work part, when both of the inclined work parts are overlapped with each other, to form a bonding part;

heating and pressurizing the adhesive, whereafter a primary hardening is performed on the adhesive;

inserting a mandrel into an inner peripheral part of the heat-resistant resin belt, whereafter a heat treatment is performed; and evaluating that an external shape displacement f(x) measured by surface scanning via a displacement gauge along each of the longitudinal axes of shafts over which the heat-resistant belt is stretched satisfies the following formula (1):

$$\int_0^x |f(x) - g(x)| dx \leq \frac{XL}{6800}, \qquad (1)$$

wherein "X" (mm) is a length of the heat-resistant resin belt in a width direction thereof; "L" (mm) is a perimeter of the heat-resistant resin belt; "x" is a length from a scan beginning point in a scanning direction parallel to each of the longitudinal axes of shafts used to stretch the heat-resistant belt or an edge of the heat-resistant belt; and "g(x)" represents an ideal external shape displacement of the heat-resistant resin belt, here, when g(x)=C (a constant profile), a special profile is set to g(x) so that a left side of the formula (1) takes a minimum value; whilst, when g(x)=a variable, another special profile or an ideal external shape displacement of the heat-resistant resin belt to be targeted by which neither wrinkling occurred in a test paper when the thus manufactured heat-resistant belt is built into an image forming apparatus and printing is performed using the heat-resistant belt or shaving of an inner surface of the heat-resistant belt is present, is set to g(x).

9. The manufacturing method of the heat-resistant resin belt according to claim 8, wherein a thermal expansion coefficient of the mandrel is larger than that of the resin sheet.

* * * * *